(12) United States Patent
Ha et al.

(10) Patent No.: US 9,699,335 B2
(45) Date of Patent: Jul. 4, 2017

(54) METHOD OF PROVIDING SCREEN FOR MANIPULATING APPLICATION EXECUTION OF IMAGE FORMING APPARATUS AND IMAGE FORMING APPARATUS PERFORMING THE METHOD

(71) Applicant: Samsung Electronics Co., Ltd., Suwon-si (KR)

(72) Inventors: Kwang-soo Ha, Seoul (KR); Se-young Kim, Yongin-si (KR); Se-rrah Lim, Bucheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/666,696

(22) Filed: Mar. 24, 2015

(65) Prior Publication Data

US 2015/0350470 A1    Dec. 3, 2015

(30) Foreign Application Priority Data

Jun. 3, 2014   (KR) ........................ 10-2014-0067797

(51) Int. Cl.
*H04N 1/00* (2006.01)
*G06F 3/0482* (2013.01)
*G06F 3/0485* (2013.01)

(52) U.S. Cl.
CPC ....... *H04N 1/00503* (2013.01); *G06F 3/0482* (2013.01); *G06F 3/0485* (2013.01); *H04N 1/00352* (2013.01); *H04N 1/00389* (2013.01); *H04N 1/00411* (2013.01); *H04N 1/00419* (2013.01); *H04N 1/00424* (2013.01); *H04N 1/00474* (2013.01); *H04N 1/00482* (2013.01); *H04N 1/00514* (2013.01)

(58) Field of Classification Search
None
See application file for complete search history.

(56) References Cited

U.S. PATENT DOCUMENTS

| 6,725,214 | B2 * | 4/2004 | Garcia-Chiesa | G06F 17/30864 |
| 7,076,734 | B2 * | 7/2006 | Wolff | H04N 5/44543 |
| | | | | 348/E5.105 |
| 7,898,680 | B2 * | 3/2011 | Misawa | G06F 3/122 |
| | | | | 358/1.11 |
| 8,264,711 | B2 * | 9/2012 | Takahashi | H04N 1/00204 |
| | | | | 358/1.13 |
| 8,384,953 | B2 * | 2/2013 | Yamaguchi | H04N 1/00408 |
| | | | | 358/1.11 |

(Continued)

FOREIGN PATENT DOCUMENTS

| EP | 2667289 | 11/2013 |
| JP | 2002-55750 | 2/2002 |

OTHER PUBLICATIONS

Extended European Search Report dated Jan. 4, 2016 in European Patent Application No. 15162078.8.

*Primary Examiner* — Paul F Payer
(74) *Attorney, Agent, or Firm* — Staas & Halsey LLP

(57) ABSTRACT

A method of providing a screen image for manipulating an application execution of an image forming apparatus includes a plurality of user interfaces (UIs) through which independent screen image processing is performed according to a user manipulation, and an image forming apparatus performing the method.

16 Claims, 17 Drawing Sheets

(56) References Cited

U.S. PATENT DOCUMENTS

| | | | |
|---|---|---|---|
| 8,495,493 B2* | 7/2013 | Ha | G06F 3/0488 |
| | | | 715/702 |
| 8,520,267 B2* | 8/2013 | Hong | H04N 1/00225 |
| | | | 358/1.15 |
| 8,705,057 B2* | 4/2014 | Fukuoka | G06F 3/0482 |
| | | | 345/684 |
| 2008/0304103 A1 | 12/2008 | Furutani | |
| 2010/0241982 A1 | 9/2010 | Motosugi et al. | |
| 2011/0279363 A1 | 11/2011 | Shoji et al. | |

* cited by examiner

METHOD OF PROVIDING SCREEN FOR MANIPULATING APPLICATION EXECUTION OF IMAGE FORMING APPARATUS AND IMAGE FORMING APPARATUS PERFORMING THE METHOD

CROSS-REFERENCE TO RELATED APPLICATIONS

This application claims the priority benefit of Korean Patent Application No. 10-2014-0067797, filed on Jun. 3, 2014, in the Korean Intellectual Property Office, the disclosure of which is incorporated herein in its entirety by reference.

BACKGROUND

1. Field

The following description relates to a method of providing a screen image for manipulating application execution of an image forming apparatus, and an image forming apparatus performing the method.

2. Description of the Related Art

Various image forming apparatuses, such as printers, copy machines, and multi-functional devices, provide a user interface (UI) through which a user controls an operation of an image forming apparatus or inputs data. A screen image for providing such a UI is displayed on a manipulation panel of an image forming apparatus. With developments in scientific technology, hardware and software used by image forming apparatuses are also being developed, and thus UIs of image forming apparatuses are being developed in consideration of increasing user convenience.

SUMMARY

One or more embodiments of the present disclosure include a method of providing a screen image for manipulating an application execution of an image forming apparatus, the screen image including a plurality of user interfaces (UIs) through which independent screen image processing is performed according to a user manipulation, and an image forming apparatus performing the method.

Additional aspects will be set forth in part in the description which follows and, in part, will be apparent from the description, or may be learned by practice of the presented embodiments.

According to one or more embodiments of the present disclosure, a method of providing a screen image for manipulating execution of an application of an image forming apparatus includes displaying the screen image, including a first UI for setting a first option that is applied to the execution of the application and a second UI for setting a second option that is applied to the execution of the application; receiving a user manipulation with respect to the screen image from a user; and processing the screen image according to the user manipulation. In the processing of the screen image, the second UI is scrolled according to a first scroll manipulation of the user with respect to the second UI.

A direction in which the second UI is scrolled according to the first scroll manipulation may vary according to a type of the application or a location of the first UI within the screen image.

In the processing of the screen image, a partial area of the second UI may be scrolled according to a second scroll manipulation of the user with respect to the partial area of the second UI.

In the processing of the screen image, a partial area of the first UI may be scrolled according to a third scroll manipulation of the user with respect to the partial area of the first UI.

The second UI may include at least one sub-interface, the at least one sub-interface including menus of the second option and an option list corresponding to a menu selected by the user.

In the processing of the screen image, when a plurality of sub interfaces included in the second UI cannot be entirely displayed on the screen image, the screen image may be processed according to the first scroll manipulation with respect to the second UI so that only some of the plurality of sub interfaces are displayed on the screen image.

Types of menus of the first option may not be changed by the user, and at least one selected from types of menus of the second option, a sequence of the menus of the second option, and the number of menus of the second option may be changed by the user.

The first UI may further include an application execution button for executing the application.

In the processing of the screen image, the screen image may be processed so that a preview of a result of the execution of the application to which the first and second options set by the user manipulation have been applied is displayed on the first UI of the screen image.

Locations of the first UI and the second UI on the screen image may vary according to country settings stored in the image forming apparatus.

According to one or more embodiments of the present disclosure, a non-transitory computer-readable recording medium has recorded thereon a computer program, which, when executed by a computer, performs the method of providing the screen image for manipulating execution of the application of the image forming apparatus.

According to one or more embodiments of the present disclosure, an image forming apparatus for providing a screen image for manipulating execution of an application includes a display unit which displays the screen image, including a first UI for setting a first option that is applied to the execution of the application and a second UI for setting a second option that is applied to the execution of the application; a user input unit which receives a user manipulation with respect to the screen image from a user; and a screen image processing unit which processes the screen image according to the user manipulation. The screen image processing unit scrolls the second UI according to a first scroll manipulation of the user with respect to the second UI.

A direction in which the second UI is scrolled according to the first scroll manipulation may vary according to a type of the application or a location of the first UI within the screen image.

The screen image processing unit may scroll a partial area of the second UI according to a second scroll manipulation of the user with respect to the partial area of the second UI.

The screen image processing unit may scroll a partial area of the first UI according to a third scroll manipulation of the user with respect to the partial area of the first UI.

The second UI may include at least one sub-interface, the at least one sub-interface including menus of the second option and an option list corresponding to a menu selected by the user.

The screen image processing unit may process the screen image according to the first scroll manipulation with respect to the second UI so that only some of a plurality of sub interfaces are displayed on the screen image, when the plurality of sub interfaces included in the second UI cannot be entirely displayed on the screen image.

Types of menus of the first option may not be changed by the user, and at least one selected from types of menus of the second option, a sequence of the menus of the second option, and the number of menus of the second option may be changed by the user.

The first UI may further include an application execution button for executing the application.

The screen image processing unit may process the screen image so that a preview of a result of the execution of the application to which the first and second options set by the user manipulation have been applied is displayed on the first UI of the screen image.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
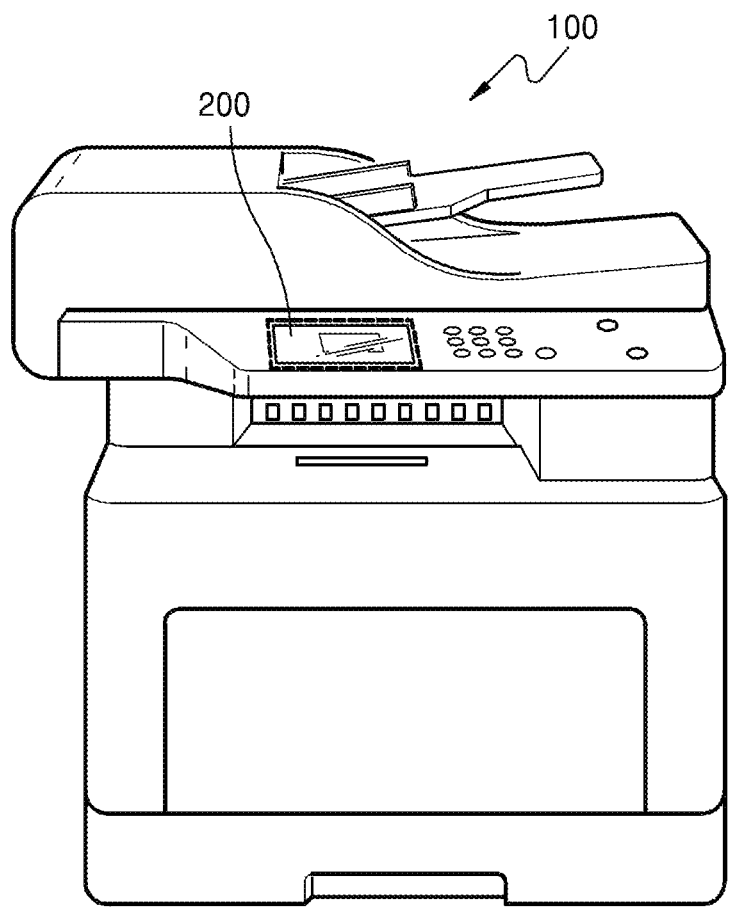
FIG. 1 is a perspective view of an image forming apparatus.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

Terms "configured" or "include" used herein should not be construed as necessary including all of several components or several operations written in the specification, but as not including some of the components or operations or as further including additional components or operations.

While such terms as "first", "second", etc., may be used to describe various components, such components must not be limited to the above terms. The above terms are used only to distinguish one component from another.

The below embodiments relate to a method of providing a screen image for manipulating execution of an application of an image forming apparatus, and an image forming apparatus using the method, and a detailed description of matters well known to one of ordinary skill in the art to which the below embodiments pertain will be omitted.

FIG. 1 is a perspective view of an image forming apparatus 100. The image forming apparatus 100 is capable of forming an image on a transfer medium such as a sheet of paper, and may be a printer, a copying machine, or a multi-functional printer, for example.

The image forming apparatus 100 may include a user interface (UI) device on a front side, a lateral side, or a rear side of the exterior thereof, in order to display information so that a user may control an operation of the image forming apparatus 100, and to receive a manipulation of the user. The UI device may denote both hardware and software that connect the user to the image forming apparatus 100, and may be mounted on the image forming apparatus 100. The UI device may be configured to separately include a display unit, or display, for displaying information and a user input unit, or user input, for receiving a user's manipulation, or may be configured as a combination of a display unit and a user input unit, such as a touch screen, for example.

As illustrated in FIG. 1, the image forming apparatus 100 may provide a screen image 200 for manipulating an application execution of the image forming apparatus 100, to the front side of the exterior of the image forming apparatus 100. The screen image 200 may be displayed on a display unit of the image forming apparatus 100. To perform a function of the image forming apparatus 100, a user may execute an application corresponding to the function. A method of providing a screen image for manipulating an application execution of the image forming apparatus 100, and the image forming apparatus 100 using the same will now be described.

Figure 2:
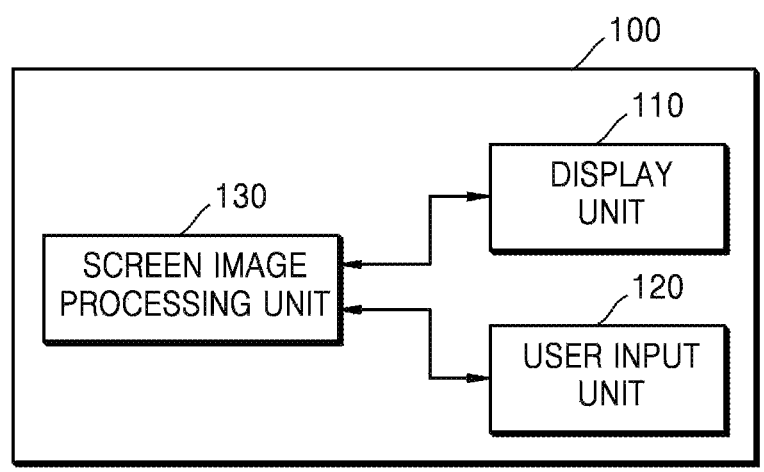
FIG. 2 is a block diagram of a structure of an image forming apparatus according to an embodiment.

FIG. 2 is a block diagram of a structure of the image forming apparatus 100 according to an embodiment. It will be understood by one of ordinary skill in the art related with the present embodiment that general-use components other than the components illustrated in FIG. 2 may be further included. Components illustrated in FIG. 2 may be combined or omitted according to the specifications of the image display apparatus 100 when being actually implemented, or additional components may be included in the block diagram of FIG. 2. For example, two or more of the components of the image display apparatus 100 shown in FIG. 2 may be combined into a single component, or a single component may be divided into two or more components.

Referring to FIG. 2, the image forming apparatus 100 may include a display unit 110, a user input unit 120, and a screen image processing unit, or processor, 130.

The display unit 110 may include a display panel (not shown) and a controller (not shown) controlling the display panel. The display panel may be any of various types of displays, such as a liquid crystal display (LCD), an organic light-emitting diode (OLED), an active matrix organic light-emitting diode (AM-OLED), and a plasma display panel (PDP), for example. The display unit 110 may be combined with a touch panel (not shown) of the user input unit 120 to form a touch screen (not shown). For example, the touch screen may be an integrated module in which a display panel and a touch panel are stacked.

The user input unit 120 may receive various commands from a user. The user input unit 120 may be at least one of a touch panel, a pen recognition panel, and a key.

The touch panel may sense a touch input of a user and output a touch event value corresponding to a touch signal corresponding to the sensed touch input. When a touch screen is formed by combining a touch panel with a display panel, the touch screen may be implemented as any of various types of touch sensors, such as a capacitive touch sensor and a resistive touch sensor. A capacitive touch sensor uses a dielectric material coated on the surface of a touch screen to sense microelectric current generated by a user's body touching on the surface of the touch screen, to thus calculate touch coordinates. A resistive touch sensor includes two electrode plates embedded in a touch screen so that, when a user touches the touch screen, the resistive touch sensor senses electric current that flows due to contact between the upper and lower plates at the touched point on the touch screen, to thus calculate touch coordinates. A touch event may mainly occur to a touch screen by a user's finger, but may also occur by a conductive object that can cause a capacitance variation.

The pen recognition panel may sense a pen's proximate input or touch input according to a manipulation of a touch pen (e.g., a stylus pen or a digitizer pen) of a user and may output a pen proximity event or pen touch event corresponding to the sensed pen's proximate input or touch input. The pen recognition panel may sense a touch input or proximate input according to a variation in the strength of an electromagnetic field caused by a pen's proximity or touch.

The key may be any of various types of keys, such as a mechanical button and a wheel, formed on any of various regions, such as, a front side, a lateral side, or a bottom side of the exterior of the main body of the image forming apparatus 100.

The screen image processing unit 130 may process an image signal for generating a screen image that is to be displayed on the display unit 110. When booting of the image forming apparatus 100 is completed, the screen image processing unit 130 may process the image signal to generate a screen image that is to be displayed on the display unit 110 and is for controlling an operation of the image forming apparatus 100. In detail, the screen image processing unit 130 may generate a screen image including various objects, such as various types of applications for executing functions of the image forming apparatus 100, various types of UIs receiving a user's manipulations, and various types of content providing information to a user. The screen image processing unit 130 may calculate attribute values such as a coordinate value, a shape, a magnitude, a color, and the like of each object, according to layouts of a screen image. The screen image processing unit 130 may generate screen images with various layouts including objects, based on the calculated attribute values. The screen images generated by the screen image processing unit 130 may be provided to the display unit 110 and each displayed on the entire region or a partial region of the display unit 110.

Connections between the display unit 110, the user input unit 120, and the screen image processing unit 130 of FIG. 2 and respective operations thereof will now be described.

The display unit 110 may display the screen image 200 as a screen image that is provided for a user's manipulations. The screen image 200 may include at least one UI for setting an option that is applied to execute an application. The user input unit 120 may receive a user manipulation with respect to the screen image 200 from the user. The screen image processing unit 130 may process the screen image 200 displayed on the display unit 110, based on a user manipulation input to the user input unit 120, in order to newly configure the screen image 200. For example, the screen image processing unit 130 may process the screen image 200 so that a UI included in the screen image 200 may be scrolled, according to a user's scroll manipulation with respect to the UI. The screen image 200 will now be described.

Figure 3:
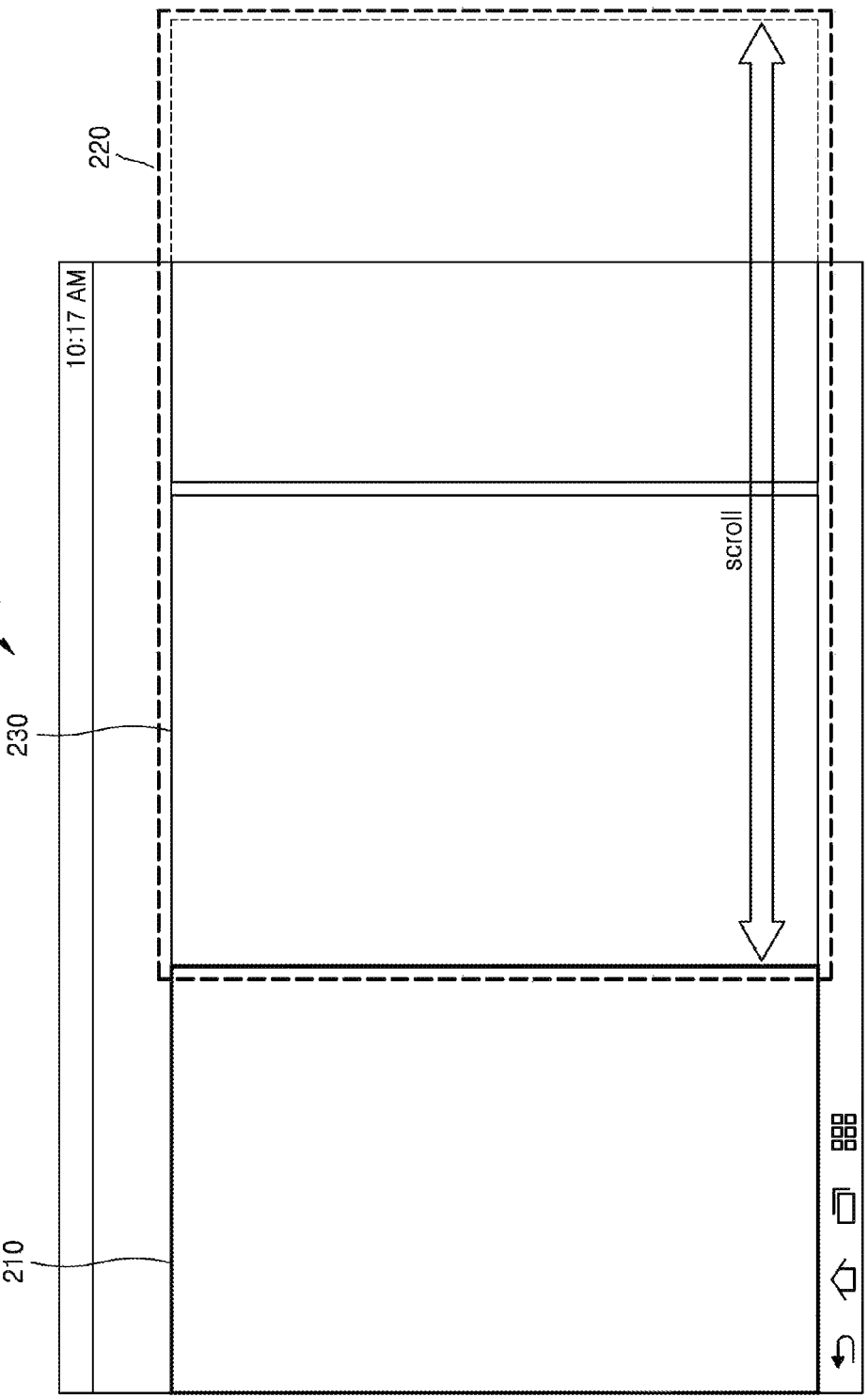
FIG. 3 illustrates a layout of a screen image for manipulating an application execution of the image forming apparatus, according to an embodiment.

FIG. 3 illustrates a layout of a screen image 200 for manipulating an application execution of the image forming apparatus 100, according to an embodiment.

Referring to FIG. 3, the screen image 200 may include a first UI 210 for setting a first option that is applied to execute an application, and a second UI 220 for setting second options that are applied to execute the application. The application may be any application selected by a user from a home screen image for controlling an operation of the image forming apparatus 100. The first option denotes a basic option that is applied to execute an application and may be included in a first UI such that an option may be set according to a minimal user manipulation. The second options denote additional options that are applied to execute an application and correspond to options that may be additionally applied by a user.

The first UI 210 may have an interface design for setting the first option by only a simple and intuitive manipulation to achieve the minimal user manipulation. The second UI 220 may have an interface design for setting the second options from various types of additional options in order to achieve detailed option setting. The second UI 220 may include a plurality of sub-interfaces 230. Each of the sub-interfaces 230 may include a predetermined number of second options and may correspond to a partial region of the second UI 220. When the plurality of sub-interfaces 230 are included in the second UI 220, the sub-interfaces 230 may not be simultaneously displayed due to a special restriction of the screen image 200. In this case, a user may input a user's manipulation so that the second UI 220 is scrolled. The first UI 210 and the second UI 220 may perform independent screen image processing in response to the input user's manipulation and thus may be independently operated.

As illustrated in FIG. 3, the second UI 220 may be scrolled in a horizontal direction so that various types of second options may be displayed. In detail, when a user manipulates the screen image 200, the screen image 200 may be processed based on the manipulation of the user. In this case, when the user's manipulation is a first scroll manipulation of the user with respect to the second UI 220, the second UI 220 may be accordingly scrolled. At this time, the first UI 210 may be fixed without being scrolled.

For example, when the user touches a certain area on the second UI 220 included in the screen image 200 and scrolls left or right, the second UI 220 may also be scrolled left or right. However, the direction in which the second UI 220 is scrolled according to the first scroll manipulation of the user may vary according to the types of applications to be executed or locations of the first UI 210 within the screen image 200.

As illustrated in FIG. 3, the first UI 210 may be located on the left side of the second UI 220 on the screen image 200. However, the locations of the first UI 210 and the second UI 220 on the screen image 200 may vary according to country settings stored in the image forming apparatus 100. For example, in countries having a culture of performing an operation from right to left, in contrast with FIG. 3, the first UI 210 may be located on the right side of the second UI 220 on the screen image 200.

A screen image 200 obtained according to the layout described above with reference to FIG. 3 will now be described in detail with reference to FIG. 4.

Figure 4:
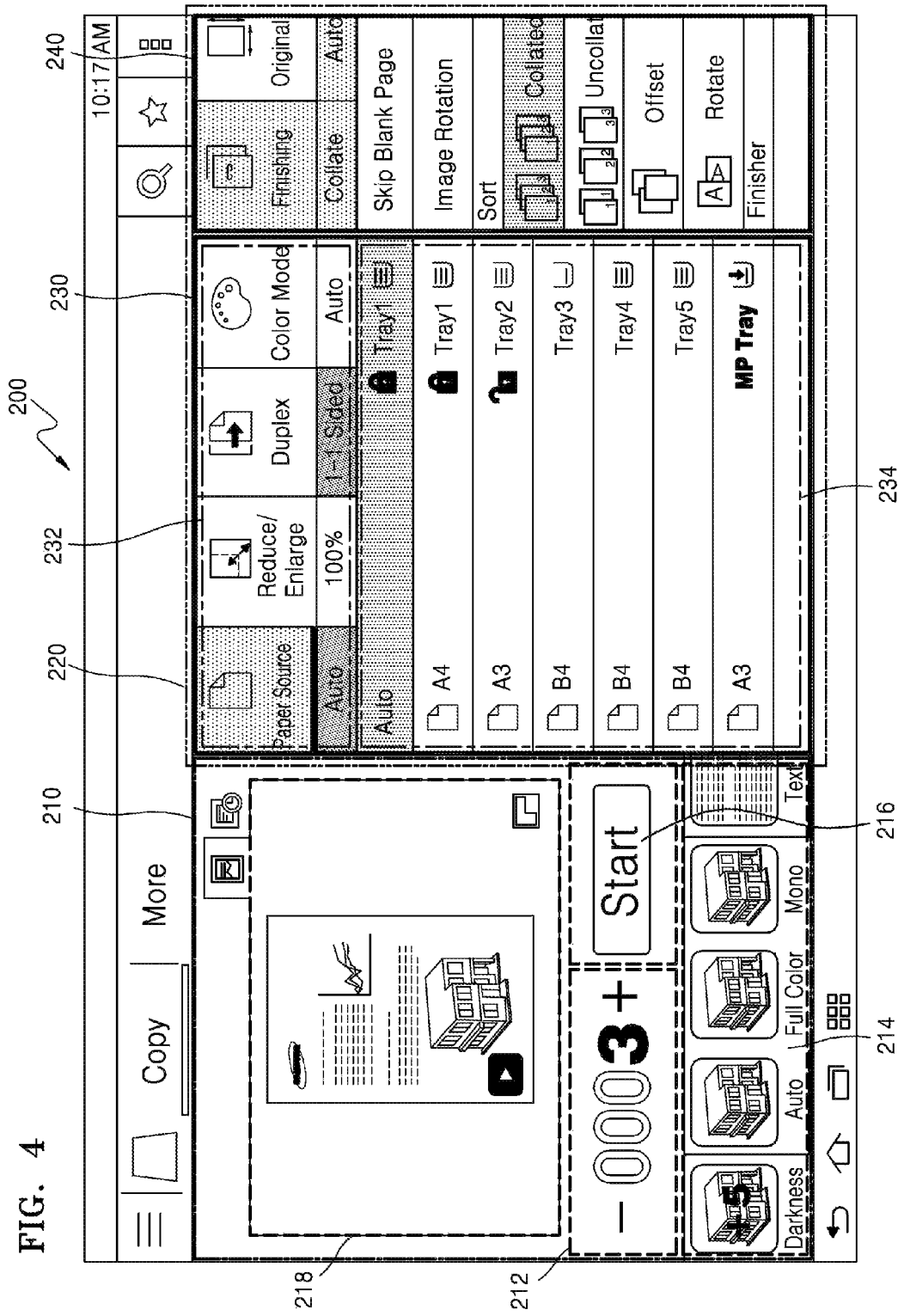
FIG. 4 illustrates a screen image for manipulating an application execution of the image forming apparatus, according to an embodiment.

FIG. 4 illustrates a screen image 200 for manipulating an application execution of the image forming apparatus 100, according to an embodiment. FIG. 4 illustrates a case where a user selects a copy application from among a plurality of applications performed by the image forming apparatus 100.

Referring to FIG. 4, the screen image 200 may include a first UI 210 for setting a first option that is applied to execute the copy application, and a second UI 220 for setting second options that are applied to execute the copy application.

The first UI 210 may include a number-of-copies input interface 212 for setting the number of copies, and an image adjustment interface 214 for adjusting the attributes of an image included in a document which is to be copied. Because the first option set by the first UI 210 is a basic option for use in an application execution, the menus of the first option may not be changed by the user but may be maintained.

The first UI 210 may further include an application execution button 216. In the copy application as illustrated in FIG. 4, the application execution button 216 may be included to start executing the copy application so that the image forming apparatus 100 may perform a copying operation. However, embodiments of the present disclosure are not limited to the application execution button 216, and the first UI 210 may include various types of buttons regarding the execution of an application.

The first UI 210 may further include an interface 218 showing a preview of a result of an execution of the copy application to which the first and second options set by a user manipulation have been applied. As illustrated in FIG. 4, a preview of a document which has been copied by applying an image attribute selected through the image adjustment interface 214 of the first UI 210 and various types of second options set through the second UI 220 may be included in the first UI 210.

The second UI 220 may include various types of second options configured by the user. As illustrated in FIG. 4, the second UI 220 may set second options related with a paper source, reduction/enlargement, duplex copying, a color mode, document arrangement, and the like and may provide an interface for displaying and setting an option list of selected options. Because the second options set through the second UI 220 are additional options for an application execution, at least one of the menu types, the menu sequence, and the number of menus of the second options may be changed, or customized, by the user. In connection with this, a UI configuration screen image for changing the configuration of a second UI will now be described with reference to FIG. 5.

Figure 5:
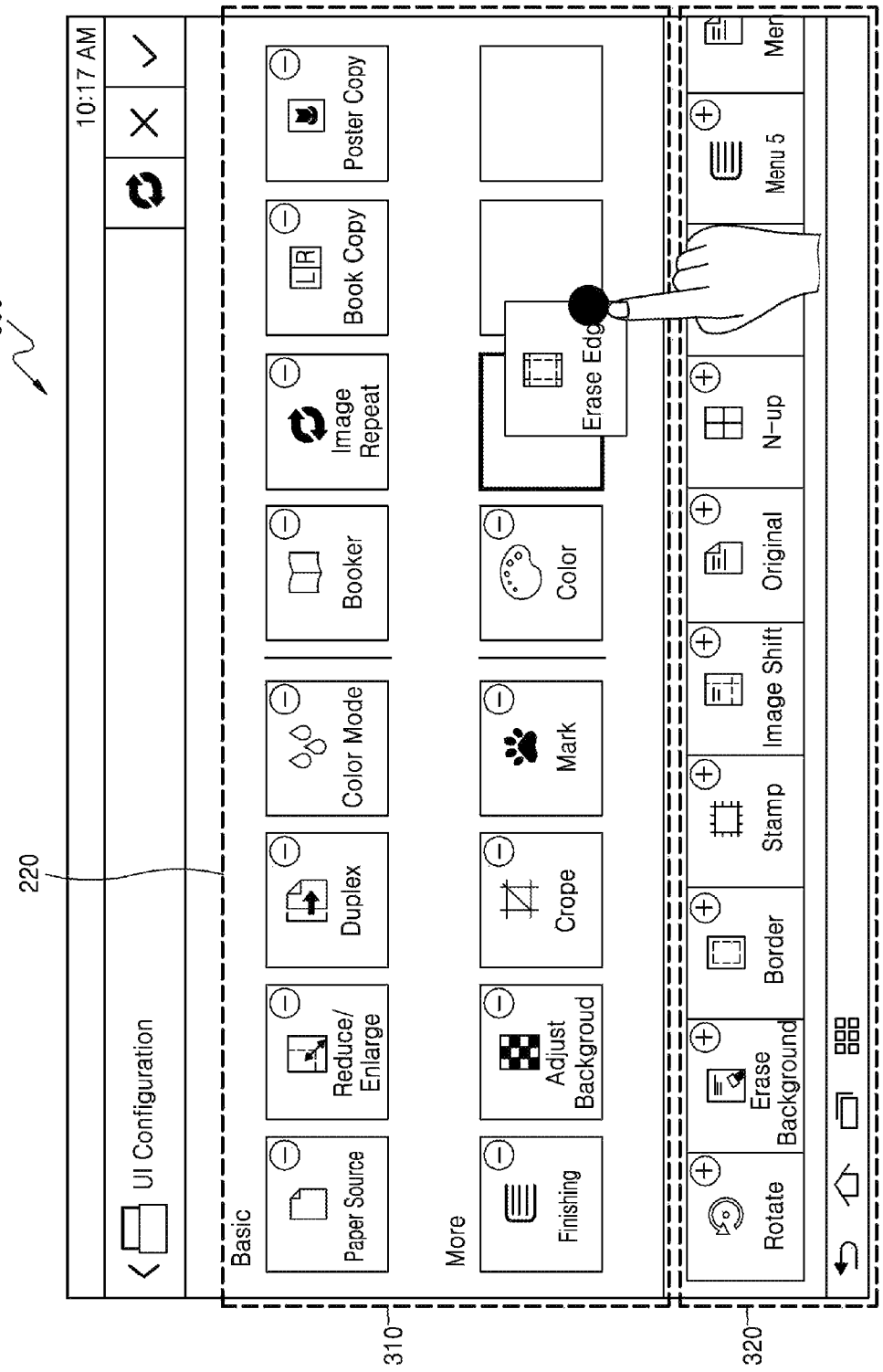
FIG. 5 illustrates a UI configuration screen image for changing the menu types, the menu sequence, and the number of menus of a second option of a second UI included in a screen image for manipulating an application execution of an image forming apparatus.

FIG. 5 illustrates a UI configuration screen image 300 for changing the menu types, the menu sequence, and the number of menus of the second option of the second UI 220.

Referring to FIG. 5, a user may change the menus of the second options set through the second UI 220, by executing the UI configuration screen image 300 for changing the configuration of the second UI 220 in the image forming apparatus 100.

The user may select the menu of a desired option from a menu collection unit 310 and place the selected menu in a menu configuration unit 320, thereby adding the selected menu to the second UI 220. Also, the user may select the menu of a desired option from the menu configuration unit 320 and place the selected menu in the menu collection unit 310, thereby deleting the selected menu from the second UI 220. In this way, the user may change the menu types or menu sequence of the second options included in the second UI 220. The user may change the menu sequence by exchanging locations between menus of an option whose locations are desired to be changed in the menu configuration unit 320.

The user may change the configuration of the second UI 220 by locating the option selected from the menu collection unit 310 of the UI configuration image 300 to an empty area or an area having an option to be changed in the menu configuration unit 320 in a drag and drop manner.

Referring to FIG. 4, the second UI 220 may include at least one sub-interface 230, and the sub-interface 230 may include menus 232 of the second options, the number of which is within a predetermined number, and an option list 234 corresponding to a menu selected by the user.

For example, as illustrated in FIG. 4, a first sub-interface 230 includes the menus 232 of the second options, such as a paper source, reduction/enlargement, duplex copying, and a color mode. A paper source menu is selected from them by the user, and an option list 234 regarding a paper source, namely, selectable options such as Auto-tray 1, A4-vertical-tray 1, A3-vertical-tray 2, B4-horizontal-tray 3, B4-vertical-tray 4, B4-vertical-tray 5, and A3-vertical-MP tray, may constitute the first sub-interface 230. A second sub-interface 240 may not be entirely displayed in the second UI 220 on the screen image 200, due to a spatial restriction of the screen image 200. In this case, the image forming apparatus 100 may enable only some of a plurality of sub-interfaces to be displayed on the screen image 200, according to the first scroll manipulation of the user with respect to the second UI 220. In other words, the user may also check not-displayed sub-interfaces of the second UI 220 by inputting the first scroll manipulation with respect to the second UI 220 to scroll the second UI 220. This will now be described in more detail with reference to FIGS. 6A and 6B.

Figure 6A:
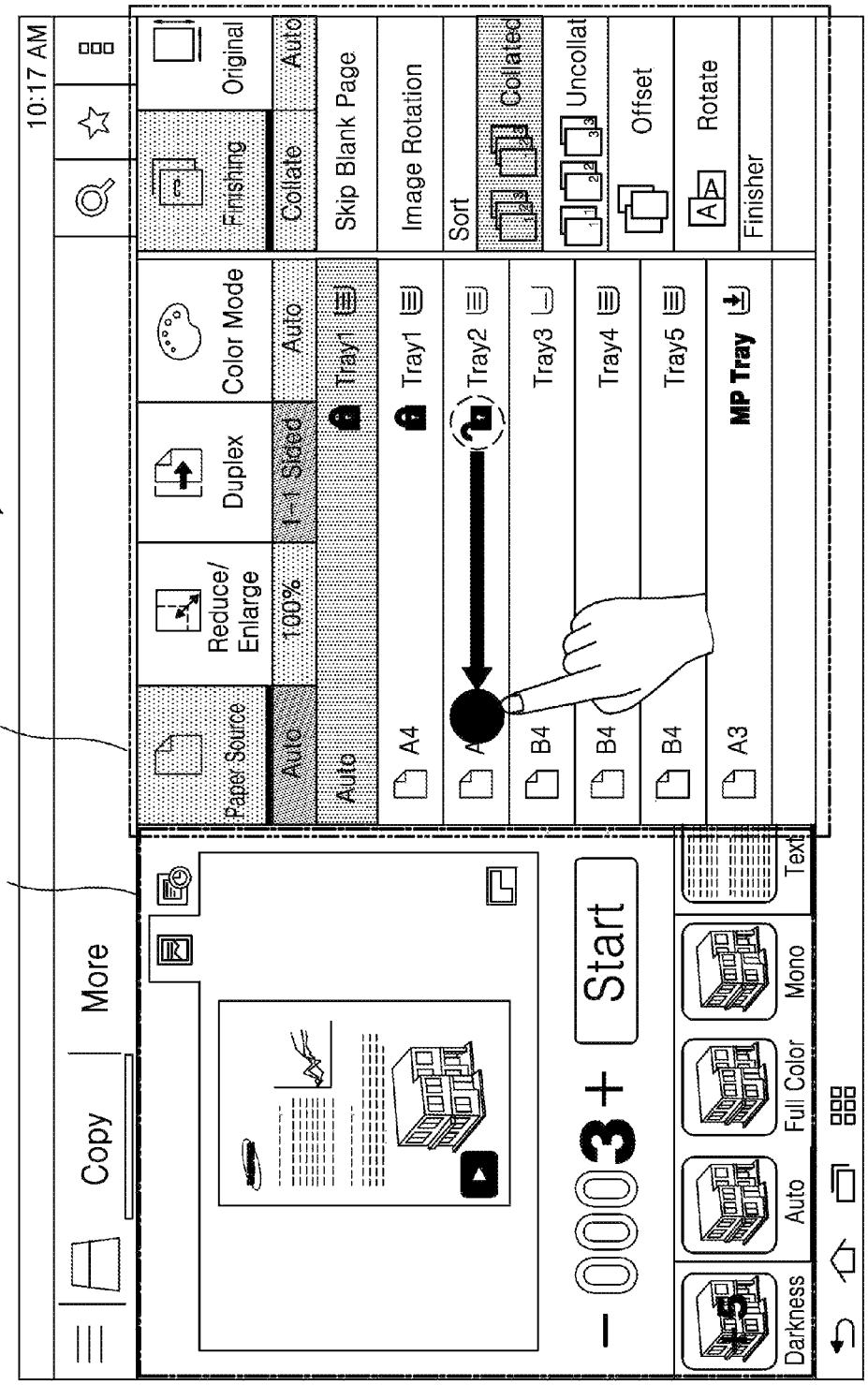
FIG. 6A illustrates a first scroll manipulation of a user with respect to the second UI.

FIG. 6A illustrates the first scroll operation of the user with respect to the second UI 220.

Referring to FIG. 6A, the screen image 200 may include the first UI 210 for setting a first option that is applied to execute an application, and a second UI 220 for setting a second option that is applied to execute the application.

As described above, the second UI 220 includes a plurality of sub-interfaces, but may not display all of the sub-interfaces due to a spatial restriction of the screen image 200. Referring to FIG. 6A, the second UI 220 includes the menus of a plurality of second options set by the user, but all of the menus of the second options may not be displayed on the screen image 200. In this case, the user may take some measures to ascertain, or view, sub-interfaces currently not displayed on the screen image 200.

The user may input the first scroll manipulation with respect to the second UI 220 to scroll the second UI 220, thereby ascertaining the not-displayed sub-interfaces of the second UI 220. For example, the user may input the first scroll manipulation with respect to the second UI 220 by touching a certain area on the second UI 220 and then moving the touch in a predetermined direction to show a not-displayed portion of the second UI 220. As illustrated in FIG. 6A, the user may input the first scroll manipulation by touching a certain area on the second UI 220 with a finger and then dragging the finger to the left while touching the screen. In this case, the image forming apparatus 100 may receive a user manipulation with respect to the screen image 200 and process the screen image 200 based on the user manipulation. This will now be described in detail with reference to FIG. 6B.

Figure 6B:
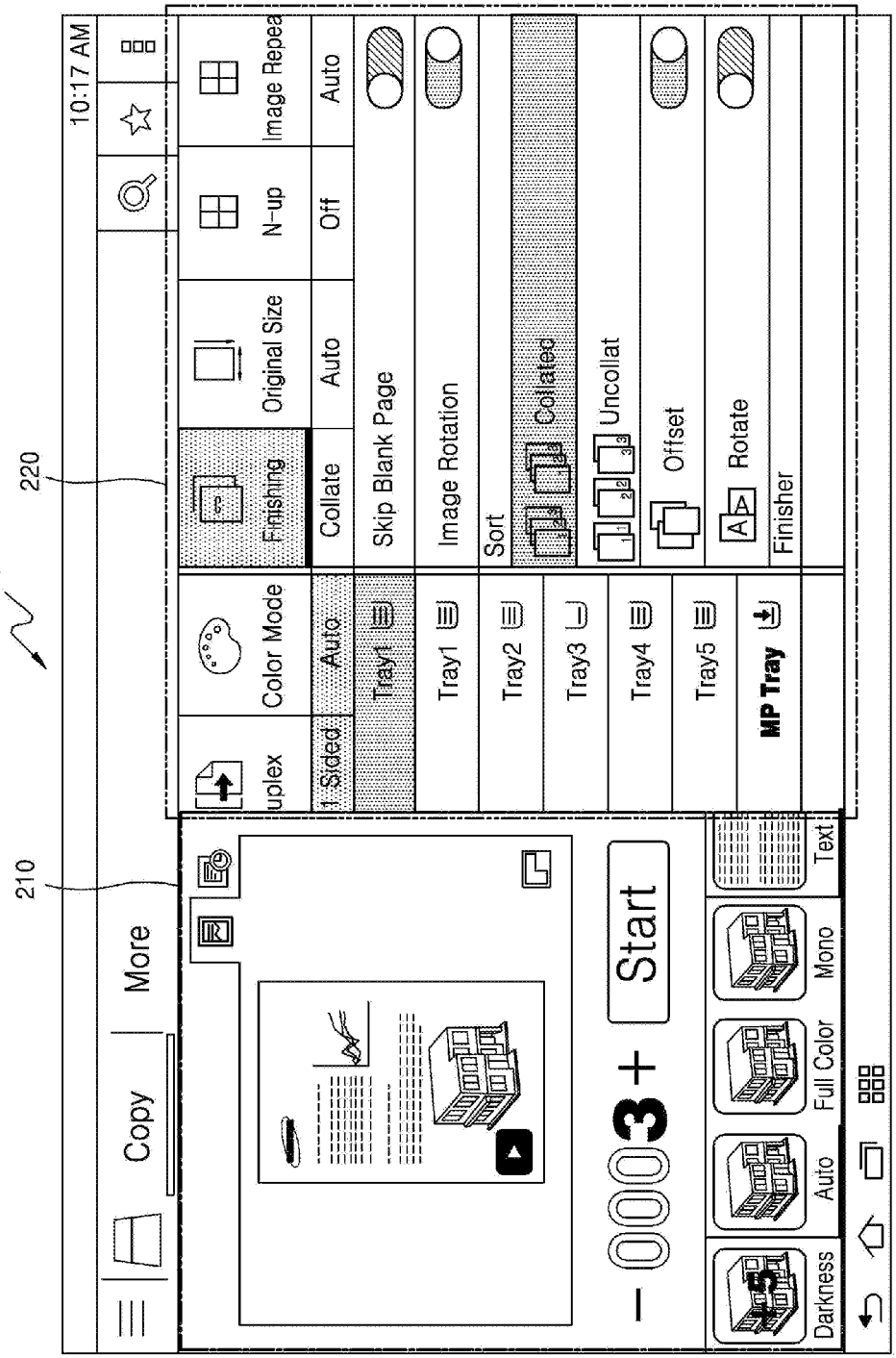
FIG. 6B illustrates a second UI scrolled according to the first scroll manipulation of the user with respect to the second UI.

FIG. 6B illustrates a second UI scrolled according to the first scroll manipulation of the user with respect to the second UI 220.

The image forming apparatus 100 may receive the first scroll manipulation of the user with respect to the second UI 220 and process the screen image 200 so that the second UI 220 is scrolled according to the first scroll manipulation. For example, as illustrated in FIG. 6B, when the user performs the first scroll manipulation with respect to the second UI 220 from right to left, the second UI 220 may be scrolled from right to left.

As illustrated in FIGS. 6A and 6B, the second UI 220 may move in such a way that the second UI 220 on the screen image 200 is entirely scrolled. However, only a partial area of the second UI 220 may be scrolled. This will now be described in greater detail with reference to FIG. 7.

Figure 7:
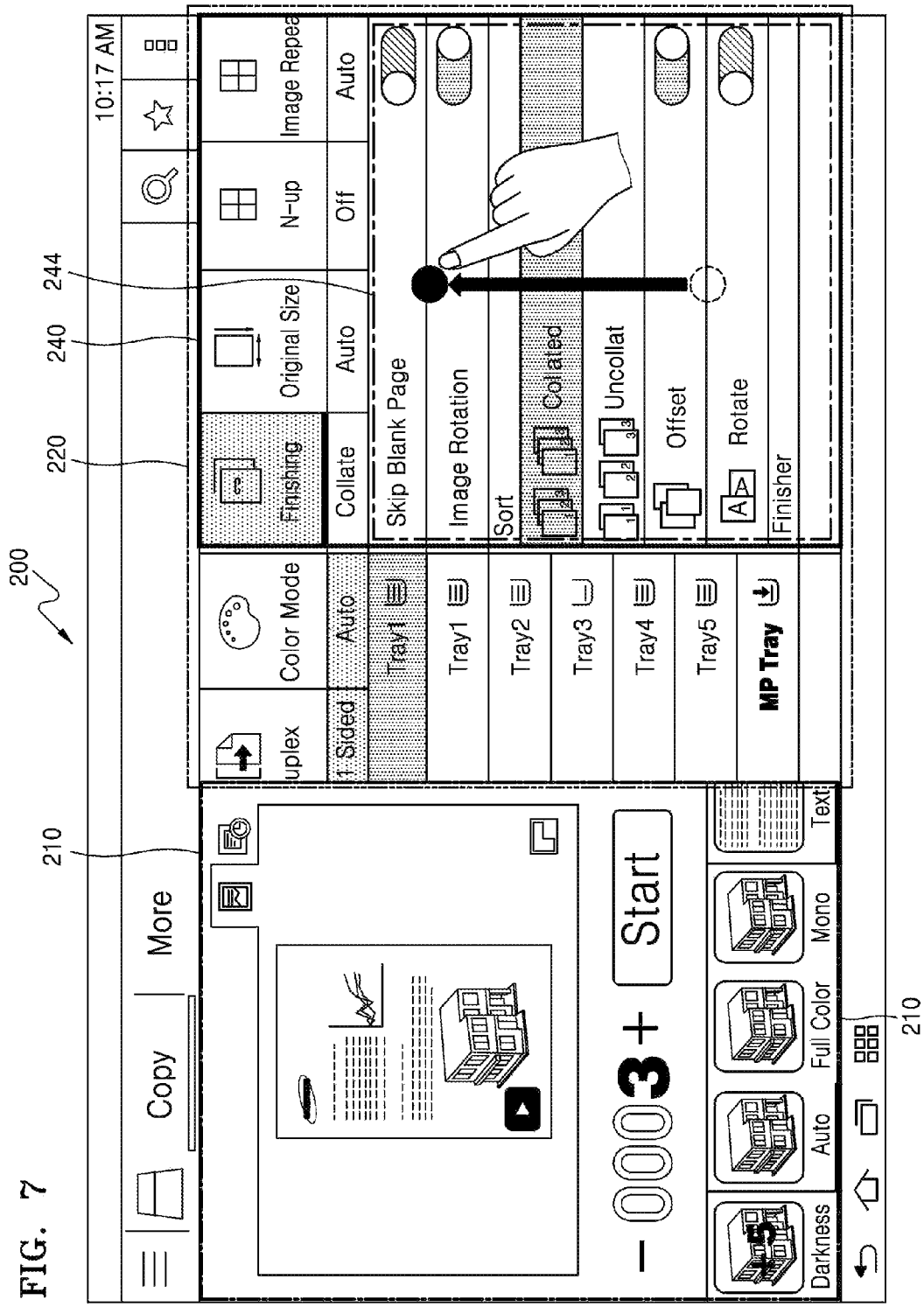
FIG. 7 illustrates scrolling of a partial area of the second UI according to a second scroll manipulation of the user with respect to the partial area of the second UI.

FIG. 7 illustrates scrolling of a partial area of the second UI 220 according to a second scroll manipulation of the user with respect to the partial area of the second UI 220.

Referring to FIG. 7, the screen image 200 may include the first UI 210 for setting a first option that is applied to execute an application, and the second UI 220 for setting second options that are applied to execute the application.

Referring to FIG. 7, the second UI 220 includes a sub-interface 240 including 4 menus corresponding to the second options and an option list 244 corresponding to a menu selected from the 4 menus, but the option list 244 may not be entirely displayed on the screen image 200. In this case, as illustrated in FIG. 7, the image forming apparatus 100 may receive a user manipulation with respect to the screen image 200 and process the screen image 200 based on the user manipulation. In detail, the image forming apparatus 100 may receive the second scroll manipulation of the user with respect to a partial area of the second UI 220 and process the screen image 200 so that the partial area of the second UI 220 is scrolled according to the second scroll manipulation.

For example, as illustrated in FIG. 7, when the user performs the second scroll manipulation with respect to the option list 244, which is a partial area of the second UI 220, from down to up, the option list 244 may be scrolled from down to up.

As described above with reference to FIGS. 6A, 6B, and 7, the entire area or a partial area of the second UI 220 included in the screen image 200 may be moved in a scrolling manner.

Although the first UI 210 is not entirely scrolled but is fixed, the first UI 210 may be partially scrolled. This will now be described in greater detail with reference to FIG. 8.

Figure 8:
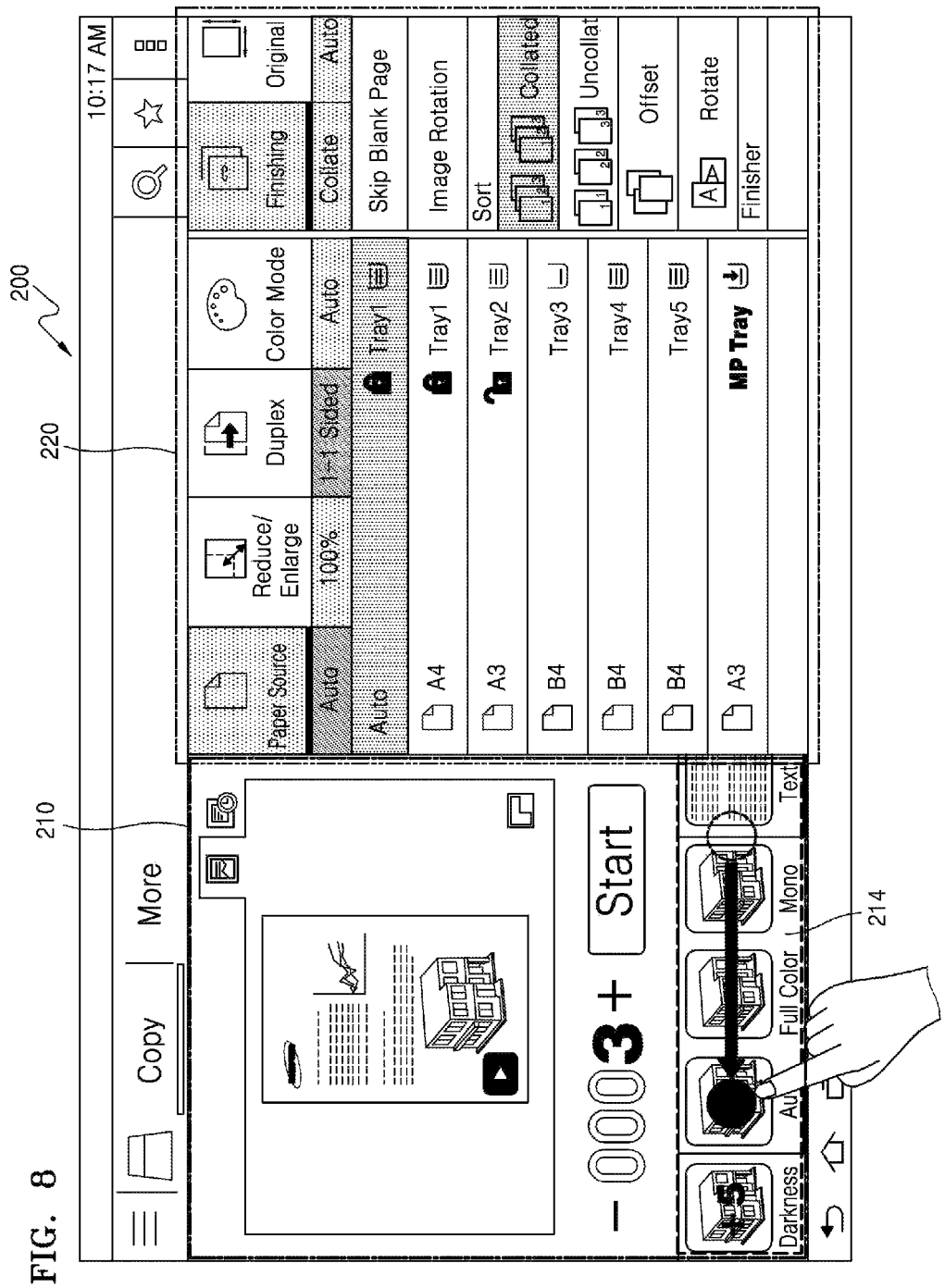
FIG. 8 illustrates scrolling of a partial area of a first UI included in the screen image for manipulating the application execution of the image forming apparatus, according to a third scroll manipulation of the user with respect to the partial area of the first UI.

FIG. 8 illustrates scrolling of a partial area of the first UI 210 according to a third scroll manipulation of the user with respect to the partial area of the first UI 210.

Referring to FIG. 8, the screen image 200 may include the first UI 210 for setting a first option that is applied to execute an application, and the second UI 220 for setting second options that are applied to execute the application.

Referring to FIG. 8, the first UI 210 includes the image adjustment interface 214 for adjusting the attributes of an image included in a document to be copied, but an option list regarding the image attributes may not be entirely displayed. In this case, as illustrated in FIG. 8, the image forming apparatus 100 may receive a user manipulation with respect to the screen image 200 and process the screen image 200 based on the user manipulation. In detail, the image forming apparatus 100 may receive the third scroll manipulation of the user with respect to a partial area of the first UI 210 and process the screen image 200 so that the partial area of the first UI 210 is scrolled according to the third scroll manipulation.

For example, as illustrated in FIG. 8, when the user performs the third scroll manipulation with respect to the image adjustment interface 214, which is a partial area of the first UI 210, from right to left, the image adjustment interface 214 may be scrolled from right to left.

Figure 9:
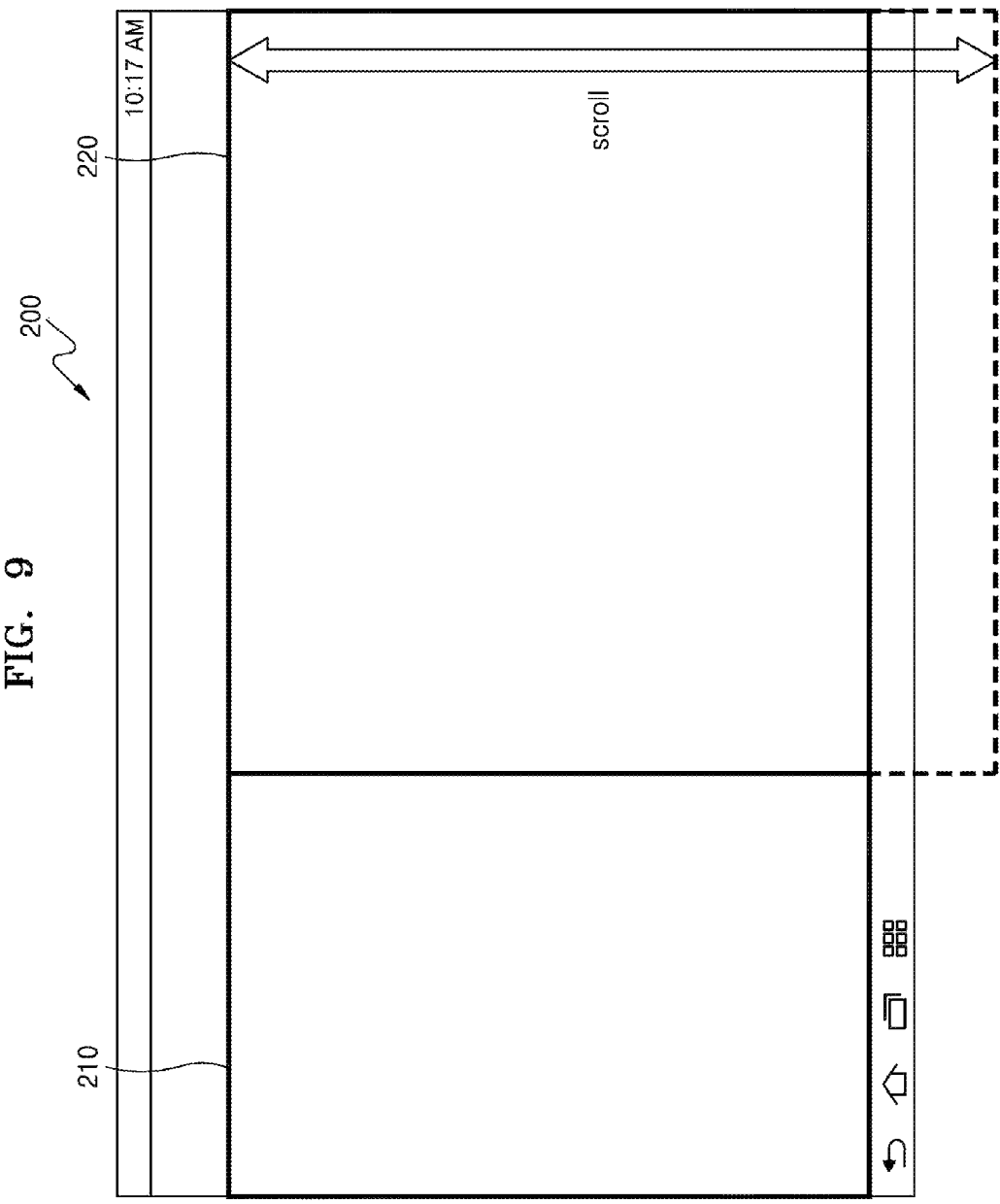
FIG. 9 illustrates a layout of a screen image for manipulating an application execution of the image forming apparatus, according to an embodiment.

FIG. 9 illustrates a layout of a screen image 200 for manipulating an application execution of the image forming apparatus 100, according to an embodiment.

Referring to FIG. 9, the screen image 200 may include a first UI 210 for setting a first option that is applied to execute the copy application, and a second UI 220 for setting second options that are applied to execute the copy application. A repeated description of matters described above with reference to FIG. 3 is omitted herein, and differences between the layouts of the two screen images 200 of FIGS. 3 and 9 will now be described.

As illustrated in FIG. 9, the second UI 220 may be scrolled in a vertical direction so that various types of second options may be displayed. In detail, when a user manipulates the screen image 200, the screen image 200 may be processed based on the manipulation of the user. In this case, when the user's manipulation is a first scroll manipulation of the user with respect to the second UI 220, the second UI 220 may be accordingly scrolled. For example, when the user touches a certain area on the second UI 220 included in the screen image 200 and scrolls up or down, the second UI 220 may also be scrolled up or down. The layout of FIG. 9 is different from that FIG. 3 in terms of the scroll direction of the second UI 220 according to the first scroll manipulation of the user.

A screen image 200 obtained according to the layout described above with reference to FIG. 9 will now be described in detail with reference to FIG. 10.

Figure 10:
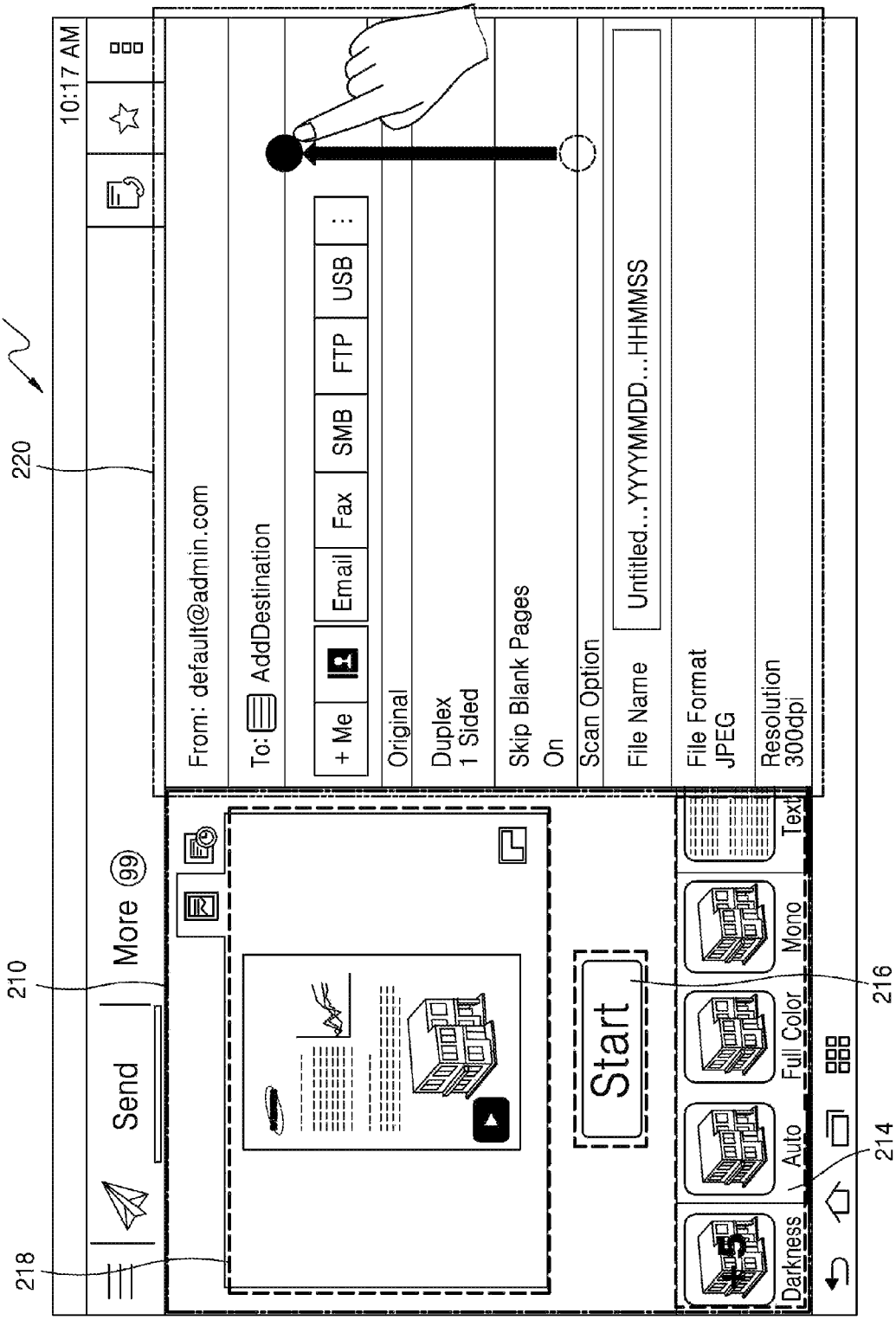
FIG. 10 illustrates a screen image for manipulating an application execution of the image forming apparatus, according to an embodiment.

FIG. 10 illustrates a screen image 200 for manipulating an application execution of the image forming apparatus 100, according to an embodiment. FIG. 10 illustrates a case where a user selects a send application from among a plurality of applications performed by the image forming apparatus 100.

Referring to FIG. 10, the screen image 200 may include a first UI 210 for setting a first option that is applied to execute an application, and a second UI 220 for setting second options that are applied to execute the application.

The first UI 210 may include an image adjustment interface 214 for adjusting the attributes of an image included in a document to be sent. The first UI 210 may further include an application execution button 216. In the send application as illustrated in FIG. 10, the application execution button 216 may be included to allow the image forming apparatus 100 to scan the document and send a scanned document to a recipient. However, embodiments of the present disclosure are not limited to the application execution button 216, and the first UI 210 may include various types of buttons regarding the execution of an application.

The first UI 210 may further include an interface 218 showing a preview of a result of an execution of the copy application to which the first and second options set by a user manipulation have been applied. As illustrated in FIG. 10, a preview of a document that has been scanned by applying an image attribute selected through the image adjustment interface 214 of the first UI 210 and various types of second options set through the second UI 220 may be included in the first UI 210.

The second UI 220 may include various types of second options. As illustrated in FIG. 10, the second UI 220 may include various types of second options, such as a sender setting unit, a recipient setting unit, a scanned document sending method, duplex scanning, blank page skipping, a file name of the scanned document, a file format of the scanned document, and a resolution of the scanned document.

When there are too many second options to entirely display on the area of the second UI 220 on the screen image 200, the user may input the first scroll manipulation with respect to the second UI 220 to scroll the second UI 220. For example, as illustrated in FIG. 10, when the second options are vertically arranged and displayed within the second UI 220, the user may scroll the second UI 220 up or down.

Figure 11:
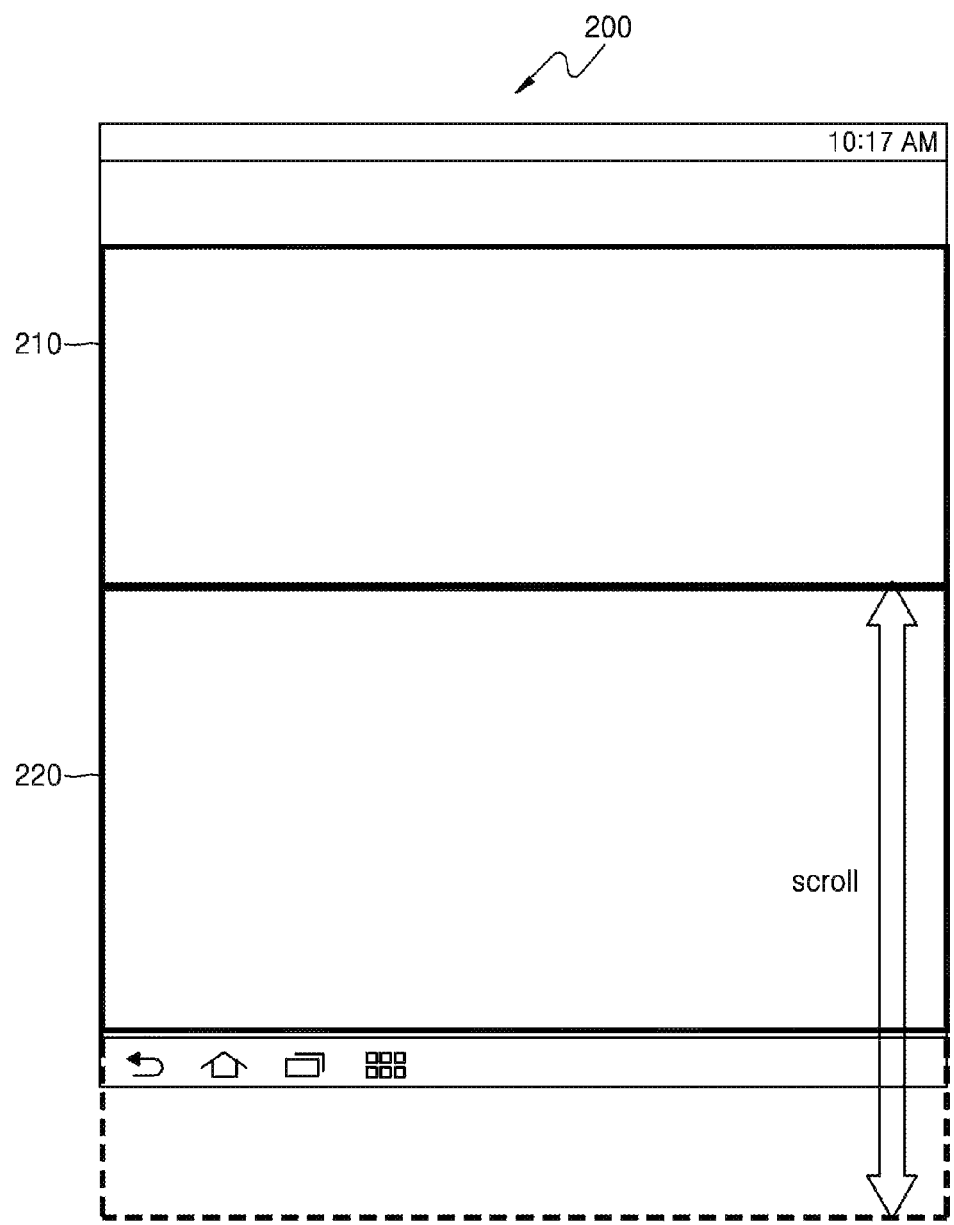
FIG. 11 illustrates a layout of a screen image for manipulating an application execution of the image forming apparatus, according to an embodiment.

FIG. 11 illustrates a layout of a screen image 200 for manipulating an application execution of the image forming apparatus 100, according to an embodiment.

Referring to FIG. 11, the screen image 200 may include a first UI 210 for setting a first option that is applied to execute an application, and a second UI 220 for setting second options that are applied to execute the application. A repeated description of matters described above with reference to FIGS. 3 and 9 is omitted herein, and differences between the layout of the screen image 200 of FIG. 11 and the layouts of the two screen images 200 of FIGS. 3 and 9 will now be described.

As illustrated in FIG. 11, the locations of the first UI 210 and the second UI 220 on the screen image 200 are different from those on the screen images 200 of FIGS. Sand 9. In other words, the first UI 210 is located above the second UI 220, that is, the second UI 220 is located below the first UI 210.

In addition, the second UI 220 may be scrolled in a vertical direction so that various types of second options may be displayed. In detail, when a user inputs a user manipulation with respect to the screen image 200, the image forming apparatus 100 may process the screen image 200 based on the user manipulation. In this case, when the user manipulation is a first scroll manipulation of the user with respect to the second UI 220, the second UI 220 may be accordingly scrolled. For example, when the user touches a certain area on the second UI 220 included in the screen image 200 and scrolls up or down, the second UI 220 may also be scrolled up or down. In contrast with FIG. 11, when the user touches a certain area on the second UI 220 and scrolls left or right, the second UI 220 may also be scrolled left or right.

The layout of FIG. 11 is different from that of FIG. 3 or 9 in terms of at least one selected from the locations of the first and second UIs 210 and 220 and the scroll direction of the second UI 220 according to the first scroll manipulation of the user.

Figure 12:
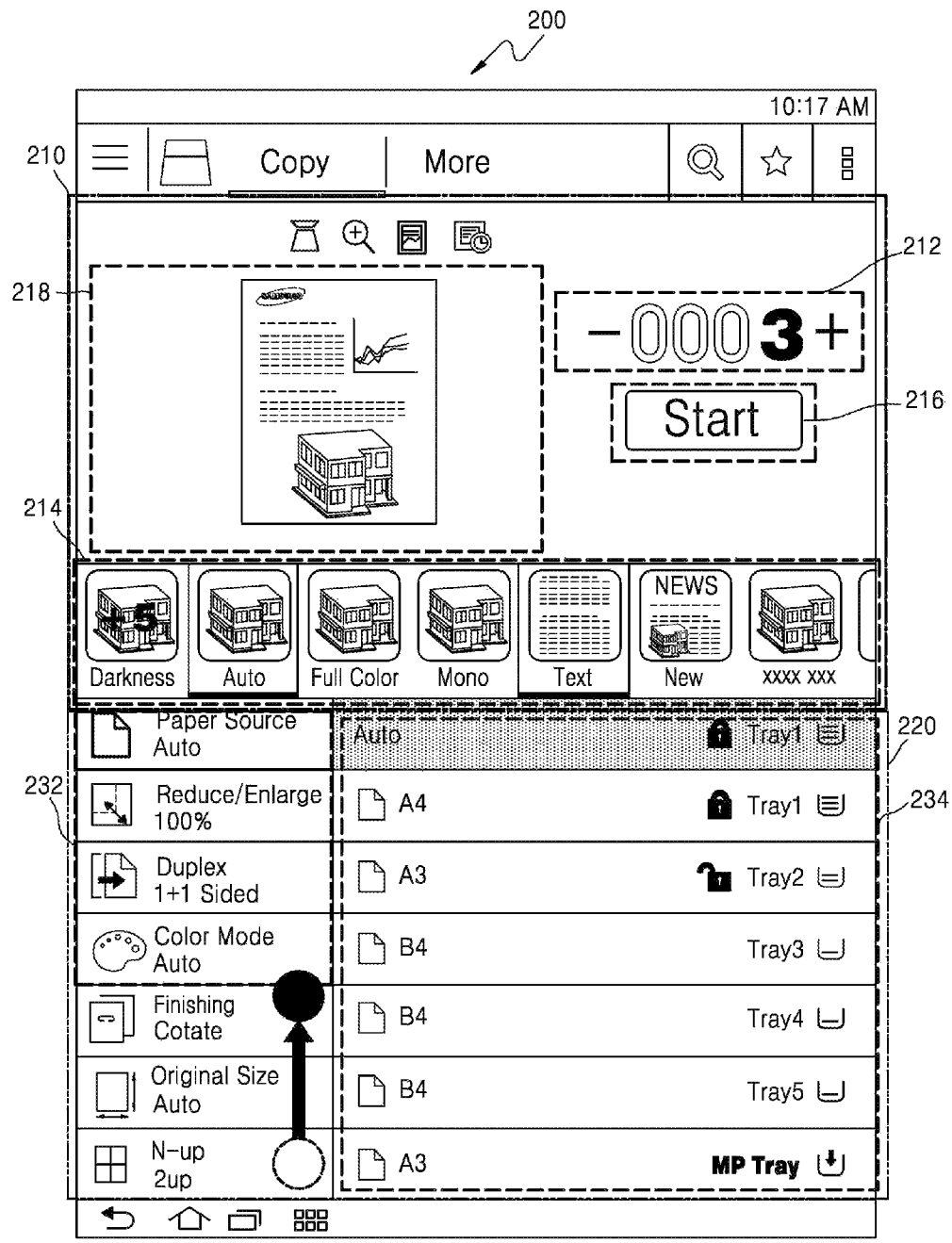
FIG. 12 illustrates a screen image for manipulating an application execution of the image forming apparatus, according to an embodiment.

FIG. 12 illustrates a screen image 200 for manipulating an application execution of the image forming apparatus 100, according to an embodiment. FIG. 12 illustrates a case where a user selects a copy application from among a plurality of applications performed by the image forming apparatus 100.

Referring to FIG. 12, the screen image 200 may include a first UI 210 for setting a first option that is applied to execute the copy application, and a second UI 220 for setting second options that are applied to execute the copy application. A repeated description of matters described above with reference to FIG. 4 is omitted herein, and differences between the two screen images 200 of FIGS. 4 and 12 will now be described.

As illustrated in FIG. 12, the first UI 210 may be located in an upper part of the screen image 200, including a number-of-copies input interface 212 for setting the number of copies, an image adjustment interface 214 for adjusting the attributes of an image included in a document to be copied, an application execution button 216, and an interface 218 showing a preview of a result of an execution of the copy application to which the first and second options set by a user manipulation have been applied. The second UI 220 including various types of second options configured by the user may be located below the first UI 210.

The menus 232 of the second options included in the second UI 220 may be vertically arranged and displayed in contrast with FIG. 4. In this case, the user may scroll up or down the entire area or a partial area of the second UI 220 included in the screen image 200. For example, when the user scrolls up or down a portion of the second UI 220 on which the menus 232 of the second options are being displayed, the second UI 220 may be entirely scrolled up or down. In addition, when the user scrolls up or down a portion of the second UI 220 on which the option list 234 corresponding to a selected menu is being displayed, only the option list 234 may be scrolled up or down.

Figure 13:
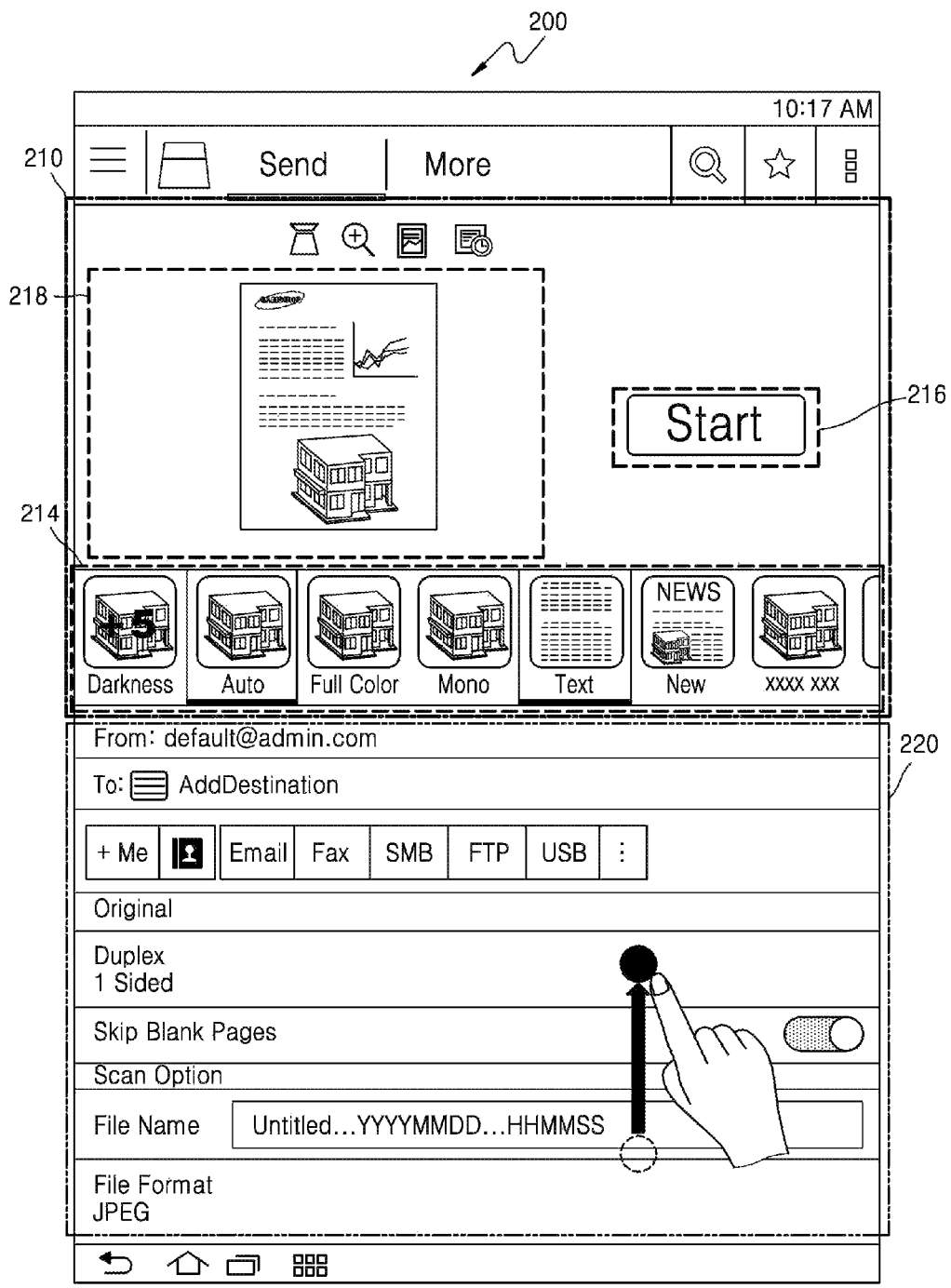
FIG. 13 illustrates a screen image for manipulating an application execution of the image forming apparatus, according to an embodiment.

FIG. 13 illustrates a screen image 200 for manipulating an application execution of the image forming apparatus 100, according to an embodiment. FIG. 10 illustrates a case where a user selects a send application from among a plurality of applications performed by the image forming apparatus 100.

Referring to FIG. 13, the screen image 200 may include a first UI 210 for setting a first option that is applied to execute an application, and a second UI 220 for setting second options that are applied to execute the application. A repeated description of matters described above with reference to FIG. 10 is omitted herein, and differences between the two screen images 200 of FIGS. 10 and 13 will now be described.

As illustrated in FIG. 13, the first UI 210 may be located in an upper part of the screen image 200, including an image adjustment interface 214 for adjusting the attributes of an image included in a document which is to be sent, an application execution button 216, and an interface 218 showing a preview of a result of an execution of the send application to which the first and second options set by a user manipulation have been applied. The second UI 220 including various types of second options may be located below the first UI 210.

Consequently, in the screen images 200 of FIGS. 4, 10, 12, and 13, the direction in which the second UI 220 is scrolled according to the first scroll manipulation of the user may vary according to the types of applications to be executed or locations of the first UI 210 within the screen image 200.

Figure 14A:
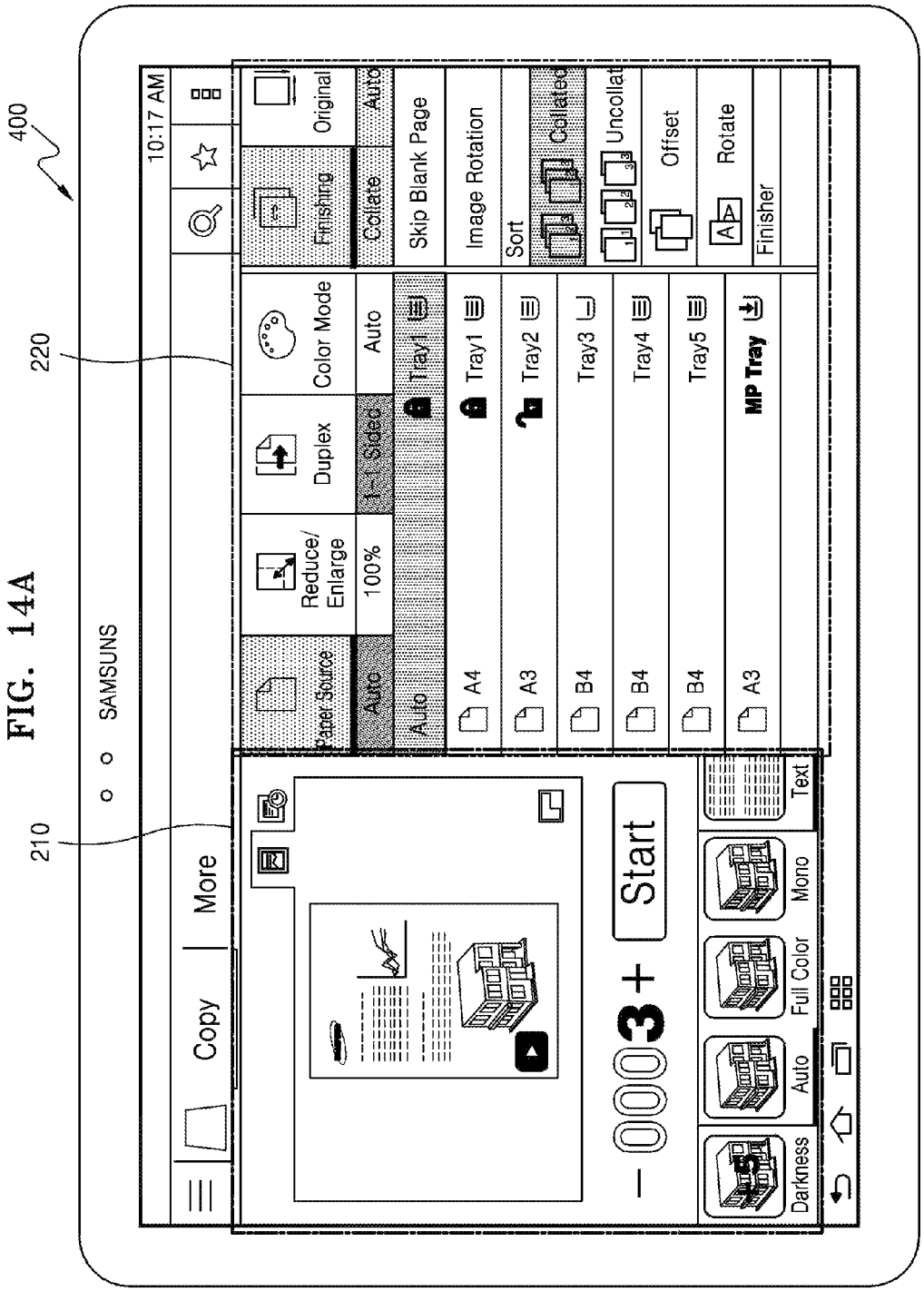
FIGS. 14A and 14B are user terminals on each of which a screen image for manipulating execution of an application of the image forming apparatus has been realized.
Figure 14B:
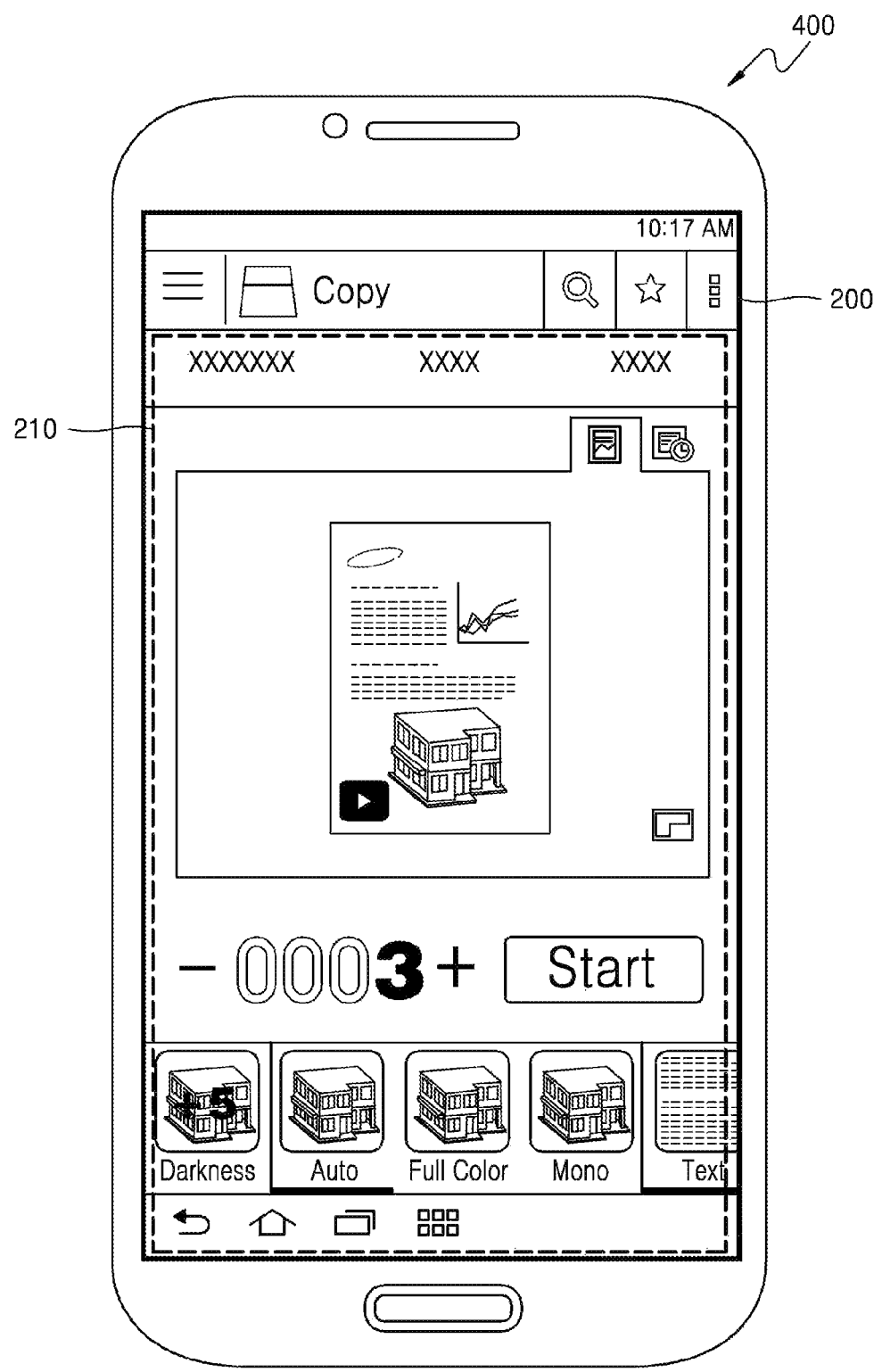

FIGS. 14A and 14B are user terminals 400 on each of which the screen image 200 for manipulating execution of an application of the image forming apparatus 100 has been realized.

With the widespread use of smart devices, the user terminals 400, such as, tablet PCs or smartphones, may also control an operation of an image forming apparatus. In this case, the screen image 200 may be provided to the user terminals 400.

In the case of the user terminal 400 of FIG. 14A having a wide screen like a tablet PC, the screen image 200, including a first UI 210 for setting a first option that is applied to execute an application, and a second UI 220 for setting second options that are applied to execute the application, may be displayed on the user terminal 400.

On the other hand, in the case of the user terminal 400 of FIG. 14B having a small screen like a smartphone, only a portion of the screen image 200 may be displayed on the user terminal 400. For example, the user terminal 400 may display only one of the first UI 210 and the second UI 220 included in the screen image 200. A user may use both the first and second UIs 210 and 220 by inputting a user manipulation for a screen image change from one UI to the other UI.

Figure 15:
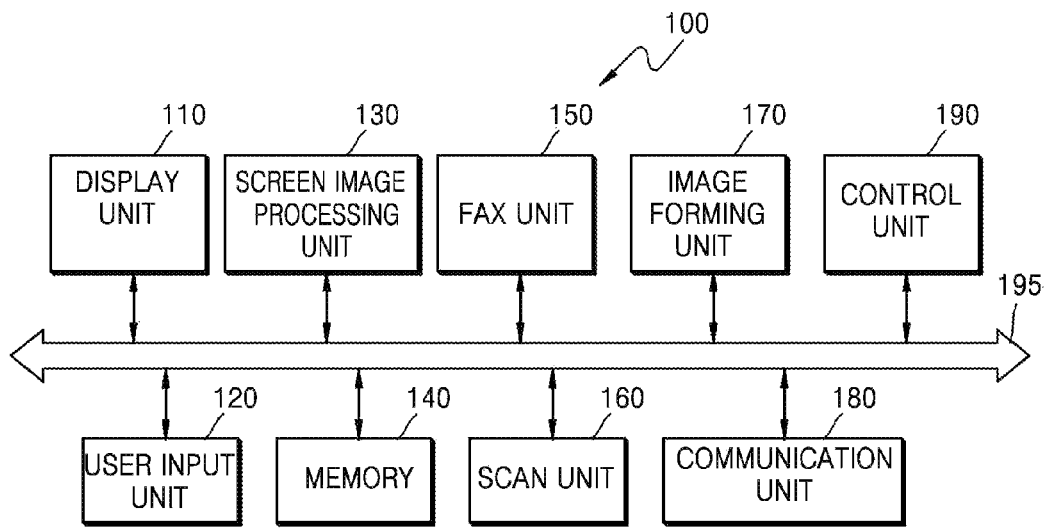
FIG. 15 is a block diagram of a structure of an image forming apparatus according to an embodiment.

FIG. 15 is a block diagram of a structure of the image forming apparatus 100 according to an embodiment. It will be understood by one of ordinary skill in the art related with the present embodiment that general-use components other than the components illustrated in FIG. 15 may be further included. Components illustrated in FIG. 15 may be combined or omitted according to the specifications of the image display apparatus 100 when being actually implemented, or additional components may be included in the block diagram of FIG. 15. For example, two or more of the components of the image forming apparatus 100 shown in FIG. 15 may be combined into a single component, or a single component may be divided into two or more components.

Referring to FIG. 15, the image forming apparatus 100 may include the display unit 110, the user input unit 120, the screen image processing unit 130, a memory 140, a fax unit 150, a scan unit 160, an image forming unit 170, a communication unit 180, and a control unit 190. The components of the image forming apparatus 100 may exchange various types of data with each other via a data bus 195.

The display unit 110 may display to a user a screen image including a UI for setting options that are applied to execute an application. The user input unit 120 may receive from the user a user manipulation with respect to the screen image displayed on the display unit 110. The image processing unit 130 may process the screen image based on the user manipulation input to the user input unit 120, in order to newly configure the screen image. Descriptions of the display unit 110, the user input unit 120, and the image processing unit 130 that are the same as those of FIG. 2 will be omitted.

The memory 140 may store all programs and pieces of data generated according to operations of the image forming apparatus 100 or necessary for the operations of the image forming apparatus 100. For example, the memory 140 may store data received from external devices, data input through the user input unit 120, data generated according to operations of the image forming apparatus 100, such as facsimile data, scan data, and copying data, and various programs used for controlling the image forming apparatus 100. The memory 140 may store at least some of pieces of contents which are to be displayed on the display unit 110.

The memory 140 may include at least one selected from an internal memory (not shown) and an external memory (not shown). The internal memory may include, for example, at least one selected from volatile memory (for example, dynamic RAM (DRAM), static RAM (SRAM), or synchronous dynamic RAM (SDRAM)), non-volatile memory (for example, one time programmable ROM (OTPROM), programmable ROM (PROM), erasable and programmable ROM (EPROM), electrically erasable and programmable ROM (EEPROM), mask ROM, or flash ROM), a hard disk drive (HDD), and a solid state drive (SSD). The external memory may include, for example, at least one selected from Compact Flash (CF), Secure Digital (SD), Micro-SD, Mini-SD, extreme Digital (xD) and Memory Stick.

The fax unit 150 sends or receives a fax by using a modem. The fax unit 150 converts image data recorded in a document into fax data that is suitable to be sent using the modem, or transmits fax data received from an external device to the image forming unit 170 so that the fax data is processed to be output to a printing medium such as a printing sheet.

The scan unit 160 produces scan data by scanning the image data recorded in the document, and transmits the scan data to the communication unit 180 to connect to a network, transmits the scan data to the memory 140 to store the scan data in the memory 140, transmits the scan data to the fax unit 150 to send the scan data by fax, or transmits the scan data to the image forming unit 170 to print out the scan data. In other words, the scan unit 160 may perform functions such as a SCAN TO SMB (Sever Message Block), a SCAN TO FTP (File Transfer Protocol), a SCAN TO WebDAV (Web Distributed Authoring and Versioning), a SCAN TO E-mail, a SCAN TO PC, and a SCAN TO BOX, for example.

The image forming unit 170 forms images and outputs copying or printing data on printing media such as paper. To output copying and printing data on printing media, the image forming unit 170 may include hardware units for charging, exposure, developing, transferring, and fusing, and software modules for operating the hardware units.

The communication unit 180 may include a network module for connection with networks according to applications and functions of the image forming apparatus 100, a modem used to sending and receiving faxes, and a USB host module for forming a data channel for portable storage media. The communication unit 180 may communicate with various external devices according to various communication methods. The communication unit 180 may include at least one selected from a Wi-Fi chip, a Bluetooth chip, a wireless communication chip, and a near field communication (NFC) chip, for example. The control unit 190 may communicate with various external devices through the communication unit 180.

The Wi-Fi chi and the Bluetooth chip may perform communication according to a Wi-Fi method and a Bluetooth method, respectively. When using a Wi-Fi chi or a Bluetooth chip, the communication unit 180 may first transmit or receive various types of connection information, such as an SSID and a session key, communicate with various external devices by using the various types of connection information, and then transmit or receive various pieces of information. The wireless communication chip is a chip that performs communication according to any of various communication standards, such as, IEEE, ZigBee, 3rd generation (3G), 3rd generation partnership project (3GPP), and long term evolution (LTE), for example. The NFC chip is a chip operating according to an NFC method that uses a 13.56 MHz frequency band from among various radio frequency identification (RFID) frequency chips, such as, 135 kHz, 13.56 MHz, 433 MHz, 860 to 960 MHz, and 2.45 GHz, for example.

The control unit 190 may control an overall operation of the image forming apparatus 100. The control unit 190 may be a microprocessor. The control unit 190 may include a plurality of processor modules separated from each other according to functions thereof, and a main processor module integrally managing the plurality of processor modules. The control unit 190 may control the display unit 110, the user input unit 120, and the image processing unit 130 to display a screen image including a UI for a user, and process the screen image based on a user manipulation input by the user so that a screen image corresponding to the user manipulation is displayed. The control unit 190 may also control various programs and data to be stored in the memory 140 and the various programs and data to be loaded from the memory 140. The control unit 190 may also control the fax unit 150 to send or receive faxes or control the scan unit 160 to scan the document. The control unit 190 may compare data downloaded from the memory 140 with data processed by the control unit 190, or may control data stored in the memory 140 to be transmitted to the image forming unit 170. The control unit 190 may receive or transmit data from or to an external device through the communication unit 180.

The names of the components of the image forming apparatus 100 may change. The image forming apparatus 100 may include at least one of the aforementioned components. Some of the aforementioned components may be omitted, or other components may be further included in addition to the aforementioned components.

Figure 16:
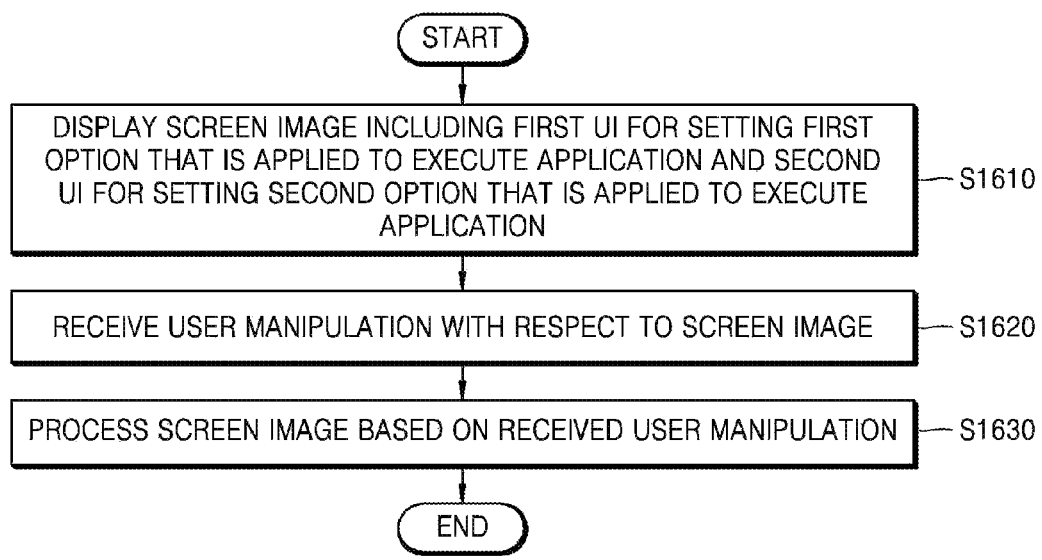
FIG. 16 is a flowchart of a method of providing a screen image for manipulating an application execution of an image forming apparatus, according to an embodiment.

FIG. 16 is a flowchart of a method of providing a screen image 200 for manipulating an application execution of the image forming apparatus 100, according to an embodiment. Although omitted, the above descriptions also apply to the method of FIG. 16.

In operation S1610, the image forming apparatus 100 may display on the display unit 110 the screen image 200 including a first UI 210 for setting a first option that is applied to execute an application and a second UI 220 for setting second options that are applied to execute the application. The locations of the first UI 210 and the second UI 220 on the screen image 200 may vary according to country settings stored in the image forming apparatus 100.

In operation S1620, the image forming apparatus 100 may receive a user manipulation with respect to the screen image 200 displayed on the display unit 110 from a user through the user input unit 120. The user manipulation may be up or down scrolling of the entire area or a partial area of a UI included in the screen image 200.

In operation S1630, the screen image processing unit of the image forming apparatus 100 may process the screen image 200 based on the received user manipulation. For example, the screen image processing unit 130 may process the screen image 200 so that the second UI 220 included in the screen image 200 may be scrolled, according to a scroll manipulation of the user with respect to the second UI 220. In this case, the direction in which the second UI 220 is scrolled according to the scroll manipulation of the user may vary according to the types of applications to be executed or locations of the first UI 210 within the screen image 200.

As described above, according to the one or more of the above embodiments of the present disclosure, a screen image for manipulating execution of an application of an imaging forming apparatus is configured to be used as a user-oriented task flow aiming screen, thereby increasing user convenience.

A method of providing a screen image for manipulating execution of an application of the imaging forming apparatus can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), and so on.

The exemplary embodiments should be considered in descriptive sense only and not for purposes of limitation. Descriptions of features or aspects within each embodiment should typically be considered as available for other similar features or aspects in other embodiments.

The above-described embodiments may be recorded in computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. A method of providing a screen image to manipulate an execution of an application of an image forming apparatus, the method comprising:
    displaying the screen image, including a first user interface (UI) to set a first option that is applied to the execution of the application and a second UI to set a second option that is applied to the execution of the application;
    receiving, from a user, a user manipulation of the screen image; and
    processing the screen image according to the user manipulation,
    wherein the processing of the screen image comprises scrolling the second UI according to a first scroll manipulation of the user of the second UI,
    wherein types of menus of the first option are not changed by the user, and at least one of types of menus of the second option, a sequence of the menus of the second option, and a number of menus of the second option is changed by the user.

2. The method of claim 1, wherein a direction in which the second UI is scrolled according to the first scroll manipulation varies according to at least one of a type of the application and a location of the first UI within the screen image.

3. The method of claim 1, wherein the processing of the screen image comprises scrolling a partial area of the second UI according to a second scroll manipulation of the user of the partial area of the second UI.

4. The method of claim 1, wherein the processing of the screen image comprises scrolling a partial area of the first UI according to a third scroll manipulation of the user of the partial area of the first UI.

5. The method of claim 1, wherein the first UI further comprises an application execution button to execute the application.

6. The method of claim 1, wherein the processing of the screen image comprises processing the screen image so that a preview of a result of the execution of the application to which the first and second options set by the user manipulation have been applied is displayed on the first UI of the screen image.

7. The method of claim 1, wherein locations of the first UI and the second UI on the screen image vary according to country settings stored in the image forming apparatus.

8. The method of claim 1, wherein the scrolling the second UI includes scrolling the second UI in a horizontal direction.

9. A non-transitory computer-readable recording medium having recorded thereon a computer program, which, when executed by a computer, performs the method of claim 1.

10. An image forming apparatus to provide a screen image to manipulate an execution of an application, the image forming apparatus comprising:
    a display to display the screen image, including a first user interface (UI) to set a first option that is applied to the execution of the application and a second UI to set a second option that is applied to the execution of the application;
    a user input to receive, from a user, a user manipulation of the screen image; and
    a screen image processor to process the screen image according to the user manipulation,
    wherein the screen image processor is configured to scroll the second UI according to a first scroll manipulation of the user of the second UI,
    wherein types of menus of the first option are not changed by the user, and at least one selected from types of menus of the second option, a sequence of the menus of the second option, and a number of menus of the second option is changed by the user.

11. The image forming apparatus of claim 10, wherein a direction in which the second UI is scrolled according to the first scroll manipulation varies according to at least one of a type of the application and a location of the first UI within the screen image.

12. The image forming apparatus of claim 10, wherein the screen image processor scrolls a partial area of the second UI according to a second scroll manipulation of the user of the partial area of the second UI.

13. The image forming apparatus of claim 10, wherein the screen image processor scrolls a partial area of the first UI according to a third scroll manipulation of the user of the partial area of the first UI.

14. The image forming apparatus of claim 10, wherein the first UI further comprises an application execution button to execute the application.

15. The image forming apparatus of claim 10, wherein the screen image processor processes the screen image so that a preview of a result of the execution of the application to which the first and second options set by the user manipulation have been applied is displayed on the first UI of the screen image.

16. The image forming apparatus of claim 10, wherein the screen image processor is configured to scroll the second UI in a horizontal direction.

* * * * *